United States Patent [19]

Ho et al.

[11] 4,180,483

[45] Dec. 25, 1979

[54] METHOD FOR FORMING ZINC OXIDE-CONTAINING CERAMICS BY HOT PRESSING AND ANNEALING

[75] Inventors: Shih M. Ho, Pittsburgh; Tapan K. Gupta, Monroeville, both of Pa.

[73] Assignee: Electric Power Research Institute, Inc., Palo Alto, Calif.

[21] Appl. No.: 862,734

[22] Filed: Dec. 21, 1977

Related U.S. Application Data

[63] Continuation-in-part of Ser. No. 755,774, Dec. 30, 1976, Pat. No. 4,111,852.

[51] Int. Cl.² ............................................... H01B 1/08
[52] U.S. Cl. .................................... 252/518; 252/519; 252/520; 252/521; 264/235; 264/332
[58] Field of Search ................ 264/104, 332, 235; 252/518

[56] References Cited

U.S. PATENT DOCUMENTS

| | | | |
|---|---|---|---|
| 3,764,566 | 10/1973 | Matsuoka et al. | 338/21 X |
| 3,886,097 | 5/1975 | Hossenlopp | 252/518 X |
| 3,925,261 | 12/1975 | Lauterbach-Dammler | 264/104 X |
| 3,950,274 | 4/1976 | May | 252/518 X |
| 4,041,123 | 8/1977 | Lange et al. | 264/332 |

OTHER PUBLICATIONS

Hirschhorn, Joel S., *Introduction to Powder Metallurgy*, American Powder Metallurgy Institute, (1969), pp. 155–156.

*Primary Examiner*—Benjamin R. Padgett
*Assistant Examiner*—E. Suzanne Parr
*Attorney, Agent, or Firm*—Flehr, Hohbach, Test, Albritton & Herbert

[57] ABSTRACT

Zinc oxide powder and a single phase mixed oxide glass powder including bismuth oxide are mixed and then simultaneously heated and pressed to form a consolidated ceramic body of linear electrical characteristics. Subsequent annealing transforms the body to one of non-linear characteristics.

9 Claims, 1 Drawing Figure

α AND C vs ANNEALING TEMPERATURE IN HOT PRESSING PROCESS

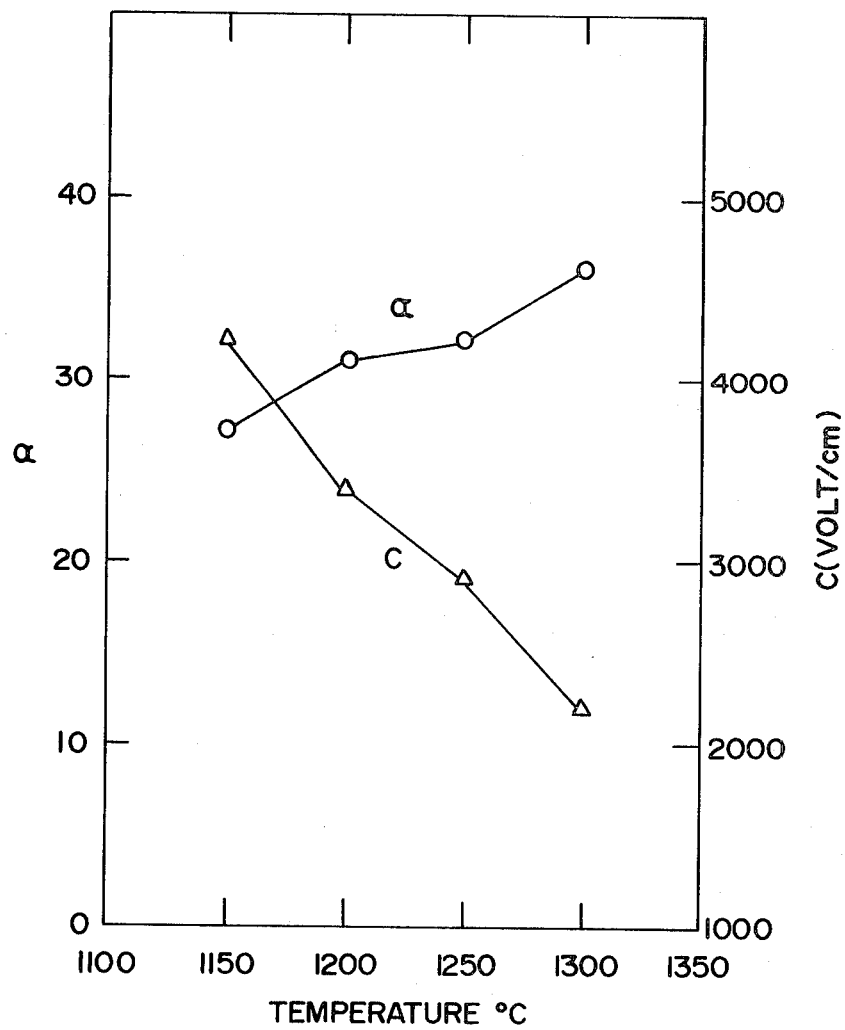
α AND C vs ANNEALING TEMPERATURE IN
HOT PRESSING PROCESS

METHOD FOR FORMING ZINC OXIDE-CONTAINING CERAMICS BY HOT PRESSING AND ANNEALING

CROSS-REFERENCE TO RELATED APPLICATION

This applicatios is a continuation-in-part of application, Ser. No. 755,774, filed Dec. 30, 1976, now U.S. Pat. No. 4,111,852, and entitled A PREGLASSING METHOD OF PRODUCING HOMOGENEOUS SINTERED ZnO NONLINEAR RESISTORS.

BACKGROUND OF THE INVENTION

Unwanted voltage surges have long been a critical problem to circuit designers of industrial and home electrical systems. Surges generated by load switching are often repetitive and range as high as 2,500 V. Lightning generated surges can range up to or over 6,000 V.

Surge protective devices have been made from SiC. It is also known that ZnO when mixed with certain oxide additives and sintered into pellets, can exhibit non-linear V-I characteristics superior to SiC. These additive modified ZnO composition are, therefore, candidate materials for non-linear lightning arrester and similar type components.

In the sintered body, the sintered ZnO grains will be coated and bound with the oxide additives. These oxide additives are effective to produce electrical non-linearity completely within the bulk of the body. The voltage limiting characteristic of these surge protective materials is believed to be due to the character of the oxide additive within the grain boundary of the body of the material, which is near-insulating at low voltage and conducting at a high voltage.

ZnO non-linear devices have been made by mixing additive oxides, as individual powders, with ZnO powder, and then pressing and sintering, as taught by Matsuoka et al, in U.S. Pat. No. 3,663,458, In that patent, ZnO powder is mixed in a wet mill for 5 hours with additive materials such as $Bi_2O_3$, $Sb_2O_3$, CoO and MnO, as individual powders, to produce a homogeneous mixture. A binder such as water or polyvinyl alcohol can be added. The mixture was then pressed at about 340 kg./sq. cm (4,800 psi) and sintered at 1000° to 1450° C. for 1 to 3 hours, providing 1.3 cm diameter by 0.05 to 0.25 cm. thick discs. Matsuoka et al, in U.S. Pat. No. 3,838,878, more thoroughly mixed ZnO powder in a wet mill for 24 hours with individual additive oxide powders and $CeF_3$ powder, to produce a mixture to which a binder could be added. The mixture was then pressed at 250 kg./sq. cm. (3,500 psi) and sintered at 1000° to 1450° C. for 1 to 10 hours, to provide bulk voltage non-linear bodies for lightning arresters, with dimensions as large as 3.5 to 4 cm diameter and 2 cm thickness.

We have found that mixing the materials is one of the most important operations in making non-linear lightning arrester components and non-linear resistors, because the physical homogeneity of the product, and the reproducibility of the electrical characteristics, will depend on thoroughly mixing of the component powders. By merely milling or blend-mixing the ingredients, even for 24 hours, only a marginally acceptable product is produced, resulting in a large percentage of lightning arrester components and resistors being rejected due to varying electrical properties caused by lack of homogeneity.

The grain boundary phase has been formed, in the prior art, by chemical reaction between the individual oxide additives in the sintering step of the process to form the resistor bodies. We have found that it is essential that the grain boundary phase be completely chemically homogeneous, and represent the equilibrium condition of the oxide additive reactant products. This means that the chemical reactions of the oxide additives must go to completion during the time that a single phase glass is being formed. Conventional fabrication methods of mixing component ZnO powder with 7 or 8 individual oxide additives, and then sintering in an attempt to reduce the mixture to a 2 component system, does not achieve the desired completely homogeneous grain boundary layer.

In our cross-referenced co-pending application, the aforementioned problems are disclosed to be solved by forming an additive glass composition from a mixture of oxides containing at least $Bi_2O_3$ prior to mixing with ZnO particles. Glasses made from these oxides are disclosed to be effective to cause electrical non-linearity with a ZnO ceramic body. The additive oxides are mill-mixed and melted to form a single phase homogeneous glass melt which is quenched. Thereafter, the glass is milled and mixed with ZnO and the mixture is pressed to form a consolidated body. Thereafter, the pressed body is heated to sintering temperatures. The process provides pellets having a microstructure with a bulk phase of ZnO particles and a boundary phase containing an oxide insulating layer binding the ZnO grains together.

SUMMARY OF THE INVENTION AND OBJECTS

In accordance with the present invention, an improved process is provided for forming a homogeneous electrically non-linear ceramic body. First, an additive mixed oxide glass powder is formed from oxides including at least $Bi_2O_3$ by heating such oxides to form a single phase, and then cooling and comminuting the glass to form a powder as in our foregoing process. Then, the glass powder is mixed with ZnO powder and simultaneously heated and pressed to form a consolidated body of electrical linearity. Thereafter, the body is annealed for transformation to a body of electrical non-linearity. During annealing, the mixed oxide glass forms a barrier between adjacent grains of zinc oxide and the grains grow in size. The desired properties are controlled by the conditions of annealing.

It is an object of the invention to provide a method for forming a non-linear ceramic body with repeatable characteristics.

It is a further object to provide such a method carried out at relatively low temperatures to minimize vaporization of components.

It is another object of the invention to provide such a method with carefully controlled microstructure and density.

Further objects and features of the invention will be apparent from the following description of the preferred embodiments taken in conjunction with the accompanying drawings.

BRIEF DESCRIPTION OF THE DRAWINGS

The drawing is a graph of the electrical characteristics of the hot pressed body of the present invention as a function of annealing temperature.

DETAILED DESCRIPTION OF THE PREFERRED EMBODIMENTS

A method is provided for forming a homogeneous electrically non-linear ceramic body, particularly useful as a resistor. In the first step of the process, a mixture of zinc oxide powder and a single phase additive mixed oxide powder including at least $Bi_2O_3$ is heated and pressed to form a consolidated ceramic body of electrical linearity. In a second step, such body is annealed to transform it to an electrically non-linear body.

A preferred method for forming the single phase additive composition is to mix the $Bi_2O_3$ with the desired other oxides for forming the glass, preferably also including $SiO_2$, and forming a single phase glass from the same. The additive glass is selected from metal oxides including $TiO_2$, $Ta_2O_5$, $FeO$, $In_2O_3$, $Al_2O_3$, $SnO_2$, $Sn_3O_4$, $Mo_2O$, $BaO$, $SrO$, $PbO$, $NiO$, $CaO$, $MgO$, and $CeF_3$, and preferably $Bi_2O_3$, $Sb_2O_3$, $Co_3O_4$, $CoO$, $MnO$, $MnO_2$, $B_2O_3$, $ZnO$, and $Cr_2O_3$, their equivalents and their mixtures.

A preferable body includes a major portion of from 60 weight % to 97.5 weight %, preferably about 65 weight % to about 85 weight % of $ZnO$, and an effective minor amount of oxide glass insulation that will cause electrical non-linearity completely within the bulk of the body, generally between 2.5 weight % to 40 weight %. In compositions less than about 2.5 weight % additive oxide insulating glass, the body of the present invention remains a conductive. In greater than 40 weight % additive oxide insulating glass, the consolidated body will remain an insulator.

The foregoing single phase chemically homogeneous additive glass may be made as follows. The oxide additive powder mixture, preferably containing about 10 mole percent to about 60 mole percent $Bi_2O_3$ and 15 mole percent to about 75 mole percent of other oxides, including good glass formers such as $SiO_2$, or $B_2O_3$. These powders suitably are grind-mixed in a ball mill. Then, the additive oxide powder mixture is melted as by placing the same in a refractory crucible or other suitable high temperature container and heating the mixture to a temperature effective to provide a single phase, chemically homogeneous liquid glass melt. Such melting may be carried out in a furnace containing silicon carbide resistive heating elements, say for about 2 to 4 hours at a temperature of between about 1100° C. to about 1600° C.

A suitable glass mixture consists of: about 10 to about 60 mole percent of $Bi_2O_3$, about 5 mole percent to about 15 mole percent of $ZnO$, about 2 mole percent to about 15 mole percent of $MnO_2$, about 2 mole percent to about 10 mole percent of $Co_3O_4$, about 5 mole percent to about 40 mole percent of $SiO_2$, about 1 mole percent to about 15 mole percent of $B_2O_3$, and from about 0 mole percent to about 30 mole percent of $Sb_2O_3$. The $B_2O_3$ and $SiO_2$ are generally included to insure that the glass will not devitrify during quenching.

The final glass composition may differ somewhat from the powder mixture due to evaporation of some oxides above 1200° C. and corrosion of crucible materials such as silica.

The molten glass is then cooled, suitably by quenching, i.e., pouring the molten glass into ice-water to form a solid, porous glass. Such quenched glass may then be comminuted by suitable means and ball-milled in acetone or other organic solvent for about 10 hours to about 30 hours. The fine glass powder is then air dried to remove the solvent, and screened to provide an average particle size between about 0.5 microns to about 125 microns diameter.

Thereafter, this glass powder is added to the $ZnO$ powder in the above proportions and grind-mixed to provide a homogeneous mixture. Suitable mixing conditions include mixing in acetone for 10 to 30 hours in a plastic jar with alumina or zirconia balls. The wet mixture is then air-dried to remove the solvent and screened to provide an average particle size of about 0.5 micron to about 125 microns in diameter. If desired, the $ZnO$ and additive mixed oxide glass may be mixed by other suitable methods.

Then, the above powder mixture is hot pressed to a consolidated ceramic body. This is accomplished by the simultaneous application of heat and pressure. Such hot pressing is suitably performed in a graphite or alumina die at a pressure of 6 to 20 ksi and preferably 8–10 ksi. A suitable temperature is from 700° C. to 1100° C. and preferably from 800°–1000° C. The holding time may be from 10 to 45 minutes or more, and is preferably between 20 and 30 minutes.

After hot pressing as above, the consolidated ceramic body is cooled and removed from the die. The hot pressed ceramic body is of relatively high density, i.e., of the order of 5.6 gm/cc for a ceramic made with 20–30 weight % glass. Such densities are calculated from the measurement of the dimension and weight. Such powder is of relatively small grain size, e.g., from 0.5 to 2.8 microns grain size.

It is significant that the hot pressed ceramic was a linear conductor. It can be inferred from this that after hot pressing, a grain-to-grain contact is maintained between undoped $ZnO$ grains prior to subsequent processing. The resistivity of the hot pressed samples is on the order of 0.7 to 0.8 ohm-cm which corresponds to the resistivity of nominally pure $ZnO$ as reported in the literature. Thus, it can be inferred that a grain-to-grain contact is maintained between pure undoped $ZnO$ grains during hot pressing.

The electrically non-linear ceramic body of the present invention is formed by annealing the foregoing hot pressed body. During annealing, grain growth and diffusion occurs during which the additive glass softens, flows and reacts with $ZnO$ and at the same time, imparts nonlinearity to the resultant ceramic. During annealing, the $ZnO$ remains in discrete grain form. There is very low shrinkage on annealing of such hot pressed ceramic, i.e., less than 5% and typically on the order of 2% or less, which permits the maintenance of dimensional stability.

It has been determined that in the above conditions, the I-V characteristics are non-linear, as determined by recordation and measurement on an oscilloscope. From this measurement, the non-linear coefficient $\alpha$ and the non-linear resistance C were calculated in the following empirical equation:

$$I + (V/C)^\alpha$$

wherein $I = amp/cm^2$, $V = volt/cm$, $C =$ material constant, and $\alpha$ is the coefficient of non-linearity. The $\alpha$ value is measured from the slope of log I vs. log V curve, and C, by definition, is volt/cm at $I = 1$ $amp/cm^2$. The value of $\alpha$ was estimated between 1 and 10 mA current and C was recorded at 1 mA.

Annealing comprises heating in the absence of pressure to a temperature suitably in the range of 1000° C. to 1300° C. for a time on the order of 1 to 2 hours. The major advantage of the present process is the ability to closely control the grain size and diffusion during annealing. Similarly, as non-linear electrical characteristics appear only after annealing, the value of α and C can be tailored to the requirements of the device when adjusting the annealing temperature and time to control the grain size and diffusion distance.

The effect of annealing on the two electrical parameters α and C are illustrated numerically in Table 1 below and graphically in the drawing.

TABLE 1 uz,6/27 Characteristics of Hot-Pressed ZnO Ceramics

| Treatment | Density (g/cm³) | Grain Size (μm) | α | C (volt/cm) | v/barrier |
|---|---|---|---|---|---|
| Hot-pressed at 1000° C., 20 min. | 5.43 | 2.6 | Linear Conductor | | — |
| Annealed at 1150° C., 1 hour | 5.26 | 5.9 | 27 | 4200 | 2.48 |
| Annealed at 1200° C., 1 hour | 5.17 | 7.3 | 31 | 3380 | 2.47 |
| Annealed at 1250° C., 1 hour | 5.15 | 8.6 | 32 | 2900 | 2.49 |
| Annealed at 1300° C., 1 hour | 5.08 | 10.6 | 36 | 2190 | 2.32 |

The illustrated values are for a ceramic including 80% zinc oxide and 20% mixed oxide glass formed by mixing glass of the following composition (Table 2).

TABLE 2

| Composition of Mixed Oxide Glass | | |
|---|---|---|
| | Original Batch Composition | |
| | (wt %) | (mol %) |
| Bi₂O₃ | 58 | 30 |
| Sb₂O₃ | 24 | 20 |
| Co₃O₄ | 5 | 5 |
| MnO₂ | 3.6 | 10 |
| B₂O₃ | 1.4 | 5 |
| ZnO | 3.4 | 10 |
| SiO₂ | 4.5 | 20 |

Referring to the drawing, it is apparent that the α value shows an increase and the C value a decrease with increasing annealing temperature. A decrease in C value (measured in volt/cm at 1 mA) generally corresponds to an increase in grain size as illustrated in Table 1. Thus, a barrier voltage can be estimated from the observed C values and the measured grain size. Referring again to Table 1, the barrier voltage ranges from 2.32 to 2.49 volt/barrier. This is similar to values obtained by sintering. It can be inferred from this that the nature of the electrical barrier formed in the hot pressed samples upon annealing is similar to the barrier formed by sintering as set forth above.

The body of the present invention can be employed as a voltage non-linear surge protective resistor body, e.g., as a lightning arrester, enveloped in a porcelain insulator with an associated line terminal. As a non-linear resistor, ceramic bodies of the present invention can be lapped at opposite surfaces by abrasive powder and provided with electrodes supplied by any suitable method such as silver painting, vacuum evaporation or flame spraying of a metal such as Al or Sn.

A further disclosure of the nature of the present invention is provided by the following specific examples of the practice of the invention. It should be understood that the data disclosed serve only as examples and are not intended to limit the scope of the invention.

EXAMPLE 1

The glass is made from the mixture of oxides set forth in Table 2. Such oxides are heated in a silica crucible at temperature of 1450° C. to form a homogeneous glass. Such glass is water quenched, dried and powdered. The glass powder (20 weight %) is then ball-milled with ZnO (80 weight %) in acetone. This mixture is then airdried and passed through a 100 mesh screen.

The screened powder is hot pressed in an alumina tube mold using a resistance heating furnace at 1000° C. and simultaneously applying pressure. The sample is held at a pressure of 8000 psi (55 MPa) for about 20 minutes. After hot pressing, the cylindrical specimens (1.2 cm in diameter) are sliced into thin discs. Some of the discs are directly submitted for I-V measurement. Others, before measurement, are annealed at different temperatures as illustrated in Table 1.

The densities of the discs are calculated from the measurement of dimensions and weight. The grain size is measured from SEM micrographs. The current-voltage (I-V) characteristics are recorded in a Tekronix Type 576 oscilloscope with the current limited to 2 mA. The value of α is calculated between 1 and 10 mA and C is measured at 1 mA which is then normalized to thickness. The results are summarized in the foregoing Table 1.

What is claimed is:

1. A method for forming a homogeneous electrically non-linear ceramic body comprising the steps of
    (a) simultaneously heating and pressing a mixture of zinc oxide powder and a single phase additive mixed oxide glass powder including at least bismuth oxide to form a consolidated ceramic body of electrical linearity, and
    annealing said ceramic body under conditions to control grain size and promote diffusion of the zinc oxide and the additive glass in order to transform it to a body of electrical non-linearity.

2. The method of claim 1 in which during annealing the mixed oxide glass forms a barrier between adjacent grains of zinc oxide and said grains grow in size.

3. The method of claim 1 in which said glass powder also includes silicon oxide.

4. The method of claim 1 in which said annealing temperature is from at least 1000° C.

5. The method of claim 1 in which said heating in step (a) is at a temperature from about 800° C. to 1000° C.

6. The method of claim 1 in which said mixed oxide glass powder is formed by mixing and melting bismuth oxide with at least one other oxide to form a single phase glass material and then comminuting said material to a powder.

7. The method of claim 1 in which said pressing is at a pressure of at least 10,000 psi.

8. The method of claim 1 in which the heating and pressing of step (a) are applied for from about 10 to about 45 minutes.

9. The method of claim 1 in which said mixed oxide glass powder comprises at least 10 mole percent of bismuth oxide.

* * * * *